United States Patent
Lee et al.

(10) Patent No.: US 7,301,530 B2
(45) Date of Patent: Nov. 27, 2007

(54) POINTER CONTROL METHOD, POINTING APPARATUS, AND HOST APPARATUS THEREFOR

(75) Inventors: Sung-jin Lee, Gyeonggi-do (KR); Soon-kyo Hong, Seoul (KR); Chul-woo Lee, Gyeonggi-do (KR); Woo-jong Lee, Gyeonggi-do (KR); Woo-jong Cho, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 807 days.

(21) Appl. No.: 10/238,879

(22) Filed: Sep. 11, 2002

(65) Prior Publication Data

US 2003/0063065 A1 Apr. 3, 2003

(30) Foreign Application Priority Data

Sep. 11, 2001 (KR) ............................... 2001-55920

(51) Int. Cl.
*G09G 5/08* (2006.01)
(52) U.S. Cl. ...................................... 345/158; 345/156
(58) Field of Classification Search ........ 345/156–158, 345/163, 173, 179, 169; 348/734
See application file for complete search history.

(56) References Cited

U.S. PATENT DOCUMENTS

| | | | | |
|---|---|---|---|---|
| 5,892,501 A | * | 4/1999 | Kim et al. | 345/158 |
| 5,926,168 A | * | 7/1999 | Fan | 345/158 |
| 5,959,612 A | * | 9/1999 | Breyer et al. | 345/157 |
| 6,108,271 A | * | 8/2000 | Junkin | 367/127 |
| 6,640,337 B1 | * | 10/2003 | Lu | 725/39 |
| 6,710,719 B1 | * | 3/2004 | Jones et al. | 340/825.49 |
| 2003/0071798 A1 | * | 4/2003 | Baron et al. | 345/179 |

FOREIGN PATENT DOCUMENTS

| | | |
|---|---|---|
| JP | 06-83528 | 3/1994 |
| JP | 11-002676 | 1/1999 |
| JP | 2001-125737 | 5/2001 |

OTHER PUBLICATIONS

Office Action issued in Japanese Patent Application No. 2002-256816 on Oct. 18, 2005.

* cited by examiner

*Primary Examiner*—Ricardo Osorio
(74) *Attorney, Agent, or Firm*—Stein, McEwen & Bui, LLP

(57) ABSTRACT

A host apparatus includes an ultrasound receiving unit receiving an ultrasound signal from a pointing apparatus and outputting an electric signal. A controlling unit calculates a position of a pointer on a display screen corresponding to a position of the pointing apparatus based on the electric signal from the ultrasound receiving unit, and outputs a control signal to the display screen to position the pointer at the calculated position of the display screen.

21 Claims, 8 Drawing Sheets

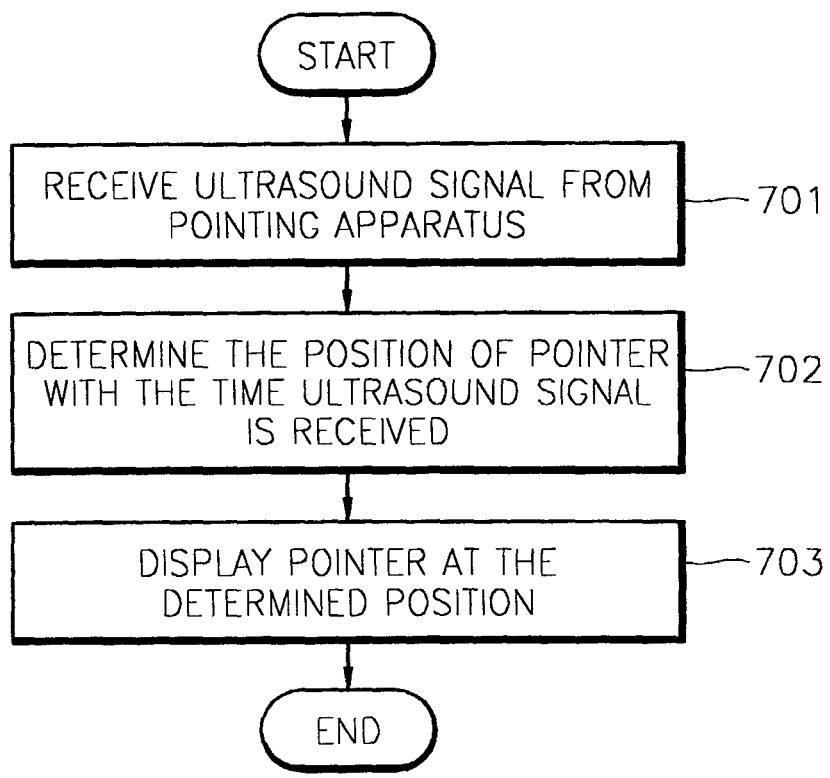
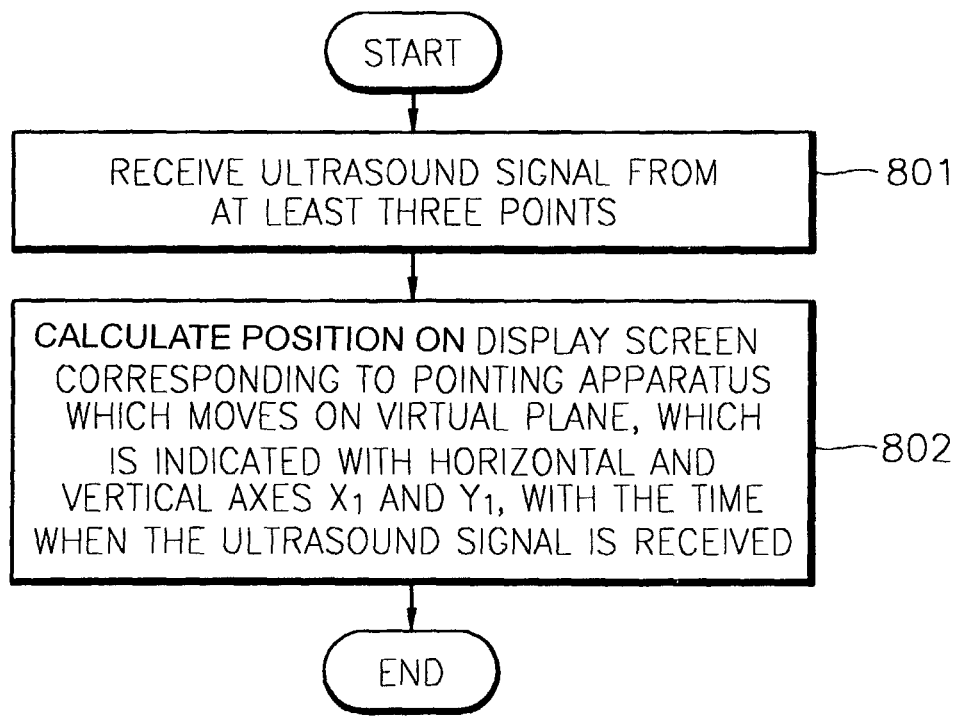

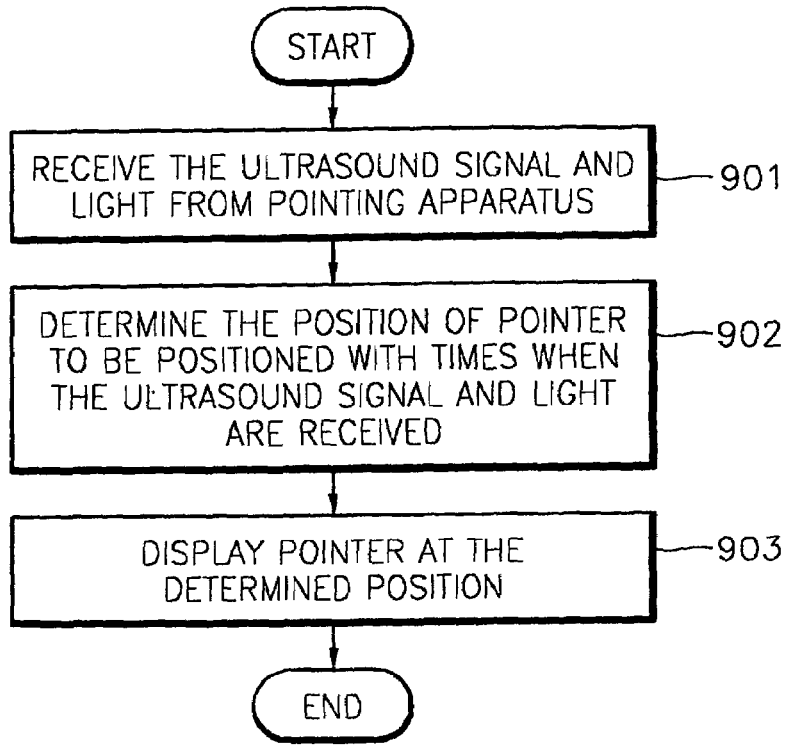
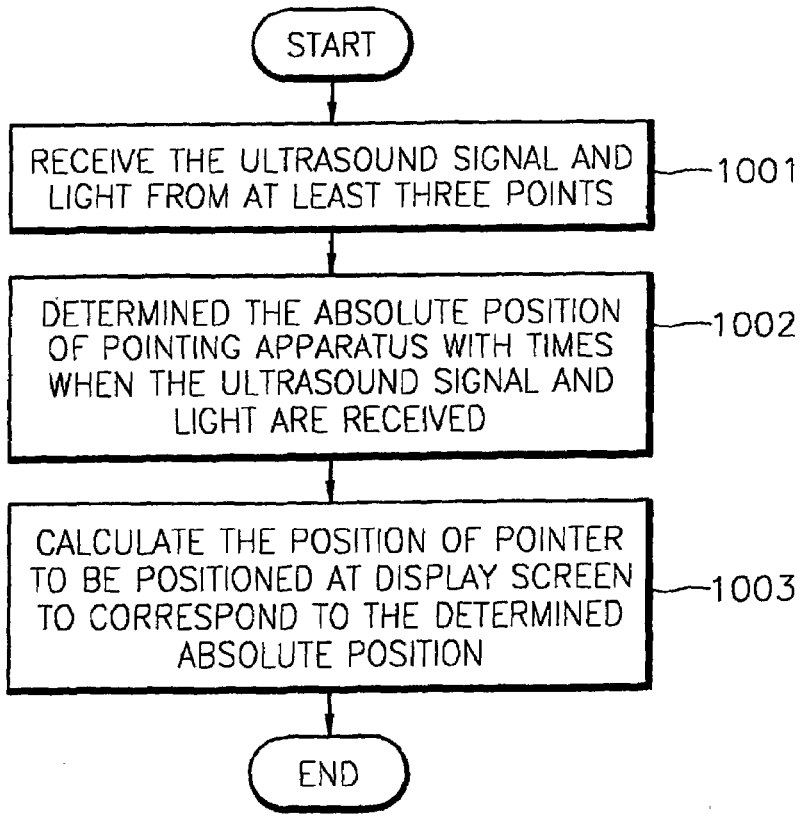

POINTER CONTROL METHOD, POINTING APPARATUS, AND HOST APPARATUS THEREFOR

CROSS-REFERENCE TO RELATED APPLICATIONS

This application claims the benefit of Korean Application No. 2001-55920, filed Sep. 11, 2001, in the Korean Intellectual Property Office, the disclosure of which is incorporated herein by reference.

BACKGROUND OF THE INVENTION

1. Field of the Invention

The present invention relates to a pointer control method, and a pointing apparatus and a host apparatus therefor, and more particularly, to a pointer control method using ultrasound, and a pointing apparatus and a host apparatus therefor.

2. Description of the Related Art

A host apparatus such as a computer allows a menu displayed on a screen of a display unit to be selected using a pointer. An apparatus to position the pointer over the menu is called a pointing apparatus. Hereinafter, a pointing system will be used to refer to a pointing apparatus and a related host apparatus.

In general, there are two types of pointer control methods: a two-dimensional (2D) control method and a three-dimensional (3D) control method. According to the 2D control method, a signal is sent to the host apparatus only when the pointing apparatus moves along a predetermined plane of the screen, thereby moving the pointer to a desired position within the screen. A mouse connected to a desktop computer is a type of apparatus that is controlled by the 2D control method. That is, moving the mouse on a particular plane, such as the plane of a desk, enables the pointer to move to the desired position. On the other hand, according to the 3D method, the pointer can be moved even though the pointing apparatus moves in a three-dimensional space, not along the plane. For instance, assuming that the screen is parallel to a plane indicated by X and Y axes, the pointer moves to correspond to $\Delta X$ and $\Delta Y$ if the pointing apparatus moves by $\Delta X$, $\Delta Y$, and $\Delta Z$ at a certain position in a space, which is indicated by the X, Y, and Z axes.

A variety of 3D pointing apparatuses built in remote controllers of the host apparatus, such as a digital TV, are developed in view of commercialization of digital broadcasting. A conventional 3D pointing apparatus detects the position of the pointing apparatus via an inertial sensor, generates information regarding the detected position, and sends the information to a host apparatus, such as a TV. Next, the host apparatus moves the pointer according to the information. Here, the inertial sensor may be a gyrosensor or an acceleration sensor.

A gyrosensor, for instance, perceives a variation in an angle of the pointing apparatus and sends a result as an electric signal to a microcomputer. Then, the microcomputer calculates a variation in the angle of the pointing apparatus using the electric signal and sends a calculated result to the host apparatus via a radio-frequency (RF) module. Next, the host apparatus moves the pointer according to the calculated result.

An acceleration sensor, for instance, perceives an acceleration of the pointing apparatus and sends a result as an electric signal to the microcomputer. Next, the microcomputer calculates a moving distance of the pointing apparatus by calculating and integrating the acceleration of the pointing apparatus with the electric signal and provides the moving distance to the host apparatus via the RF module. Then, the host apparatus receives the moving distance and moves the pointer according to the moving distance.

However, because the pointing apparatus communicates with the host apparatus by wireless communication, the pointing apparatus is prone to being exposed to various ambient conditions. Accordingly, the inertial sensor, which is attached to the pointing apparatus and detects the movement of the pointing apparatus, is vulnerable to the ambient conditions, such as vibration or movement of the pointing apparatus. In particular, the gyrosensor can sensitively detect the variation in the angle of the pointing apparatus but the gyrosensor is insensitive to a linear movement of the pointing apparatus, whereas the acceleration sensor can sensitively detect the linear movement of the pointing apparatus but the acceleration sensor is insensitive to the variation in the angle of the pointing apparatus. Also, the inertial sensor can perceive relative positions of the pointing apparatus such as an original position and a changed position. For this reason, to move the pointer to a desired position with a conventional pointing apparatus having the inertial sensor, a user must learn how to use the pointing apparatus, which can take a considerable amount of time. In particular, to use the pointing apparatus including the acceleration sensor, the moving distance of the pointing apparatus is calculated by perceiving the acceleration of the pointing apparatus and integrating the perceived acceleration twice. However, when integrating the perceived acceleration twice, much time is spent and a number of errors is high, which substantially prevents putting such commercialized products on the market.

Meanwhile, in a case of a handheld device including a remote controller, a discharge period and a weight of a power source, e.g., a battery, are very important factors that determine ease of use. However, the conventional pointing apparatus requires a high capacity from the microcomputer to process the electric signal, which is detected by the inertial sensor, and to send a processed result to a host apparatus. Such operation of the pointing apparatus not only results in a large burden placed on the microcomputer but also increases power consumption, thereby shortening a discharge period or a recharge period of the power source.

SUMMARY OF THE INVENTION

Various objects and advantages of the invention will be set forth in part in the description that follows and, in part, will be obvious from the description, or may be learned by practice of the invention.

To solve the above and other problems, it is a first object of the present invention to provide a pointing apparatus requiring less power consumption, and a pointer control method using the pointing apparatus.

It is a second object of the present invention to provide a pointing apparatus of a simple structure and a pointer control method to use the pointing apparatus.

It is a third object of the present invention to provide a pointer control method to indicate an absolute position of a pointing apparatus, and the pointing apparatus and a host apparatus therefor.

To achieve the above and other aspects of the present invention, there is provided a pointing apparatus, including: a user input unit receiving a user command; and an ultrasound transmitting unit receiving the user command to transmit an ultrasound signal, generating the ultrasound signal, and transmitting the ultrasound signal continuously or exclusively when a command is given to transmit the ultrasound signal to a host apparatus.

The user input unit includes a mode selection button to set a relative mode where the ultrasound transmitting unit continuously generates the ultrasound signal at predetermined intervals of time and transmits the ultrasound signal to the host apparatus. Otherwise, the user input unit may include a mode selection button to set an absolute mode and an ultrasound transmission button, where the ultrasound transmitting unit generates the ultrasound signal and sends the ultrasound signal to the host apparatus when a command to transmit the ultrasound signal via the ultrasound transmission button is received and the absolute mode is selected.

To achieve the above and other objects according to an embodiment of the present invention, there is provided a pointing apparatus including a user input unit receiving a user command; and an ultrasound transmitting unit including an optical generator generating a light signal and sending the light signal to a host apparatus, and an ultrasound generator generating an ultrasound signal and sending the ultrasound signal to the host apparatus when receiving a command to transmit the ultrasound signal via the user input unit.

The user input unit includes a mode selection button, and, when a relative mode is set, the ultrasound generator and the optical generator generate and output the ultrasound signal and the light signal at predetermined intervals of time substantially at a same time to the host apparatus. Otherwise, the user input unit may include a mode selection button and an ultrasound transmission button, and when an absolute mode is set using the mode selection button and the ultrasound transmission button outputs a command to transmit the ultrasound signal, the ultrasound generator and the optical generator generate and output the ultrasound signal and the light signal substantially at a same time to the host apparatus.

To achieve the above and other objects according to an embodiment of the present invention, there is provided a host apparatus a display screen; an ultrasound receiving unit receiving an ultrasound signal from a pointing apparatus and outputting an electric signal; and a controlling unit calculating a position of a pointer on the display screen corresponding to a position of the pointing apparatus based on the electric signal from the ultrasound receiving unit, and outputting a control signal to the display screen to position the pointer at the calculated position of the display screen.

To achieve the above and other objects according to an embodiment of the present invention, there is provided a host apparatus including a display screen; an ultrasound receiving unit receiving an ultrasound signal and a light signal from a pointing apparatus and outputting electric signals; and a controlling unit calculating a position of a pointer on the display screen corresponding to a position of the pointing apparatus based on the electric signals from the ultrasound receiving unit, and outputting a control signal to the display screen to move the pointer to the calculated point.

The host apparatus further includes a display unit displaying the pointer at the display screen.

The ultrasound receiving unit further includes ultrasound sensors installed on at least three different points to receive the ultrasound signal from the pointing apparatus and to output electric signals based on the ultrasound signal; and an optical sensor receiving the light signal from the pointing apparatus and outputting an electric signal based on the light signal, and the controlling unit includes a displacement calculator measuring an absolute position of the pointing apparatus with the electric signals from the ultrasound sensors and the optical sensor, determining the position of the pointer with the absolute position of the pointing apparatus, and calculating a displacement between a current position and the determined position of the pointer; and a pointer controller outputting a control signal to the display unit to position the pointer according to the displacement calculated by the displacement calculator.

To achieve the above and other objects according to an embodiment of the present invention, there is provided a pointer control method including receiving an ultrasound signal from a pointing apparatus; determining a first point on a display screen on which a pointer is to be positioned using a time when the ultrasound signal is received; and displaying the pointer at the determined point.

To achieve the above and other objects according to an embodiment of the present invention, there is provided a pointer control method including receiving an ultrasound signal and a light signal from a pointing apparatus; determining a point on a display screen on which a pointer is to be positioned, using times when the ultrasound signal and the light signal are received; and displaying the pointer at the determined point.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a flowchart illustrating an embodiment of a pointer control method according to the present invention;

FIG. 8 is a flowchart illustrating receiving an ultrasound signal and determining a position of a pointer;

FIG. 9 is a flowchart illustrating another embodiment of a pointer control method according to the present invention; and FIG. 10 is a flowchart illustrating receiving the ultrasound signal and determining the position of the pointer.

DETAILED DESCRIPTION OF THE PREFERRED EMBODIMENTS

Figure 1:
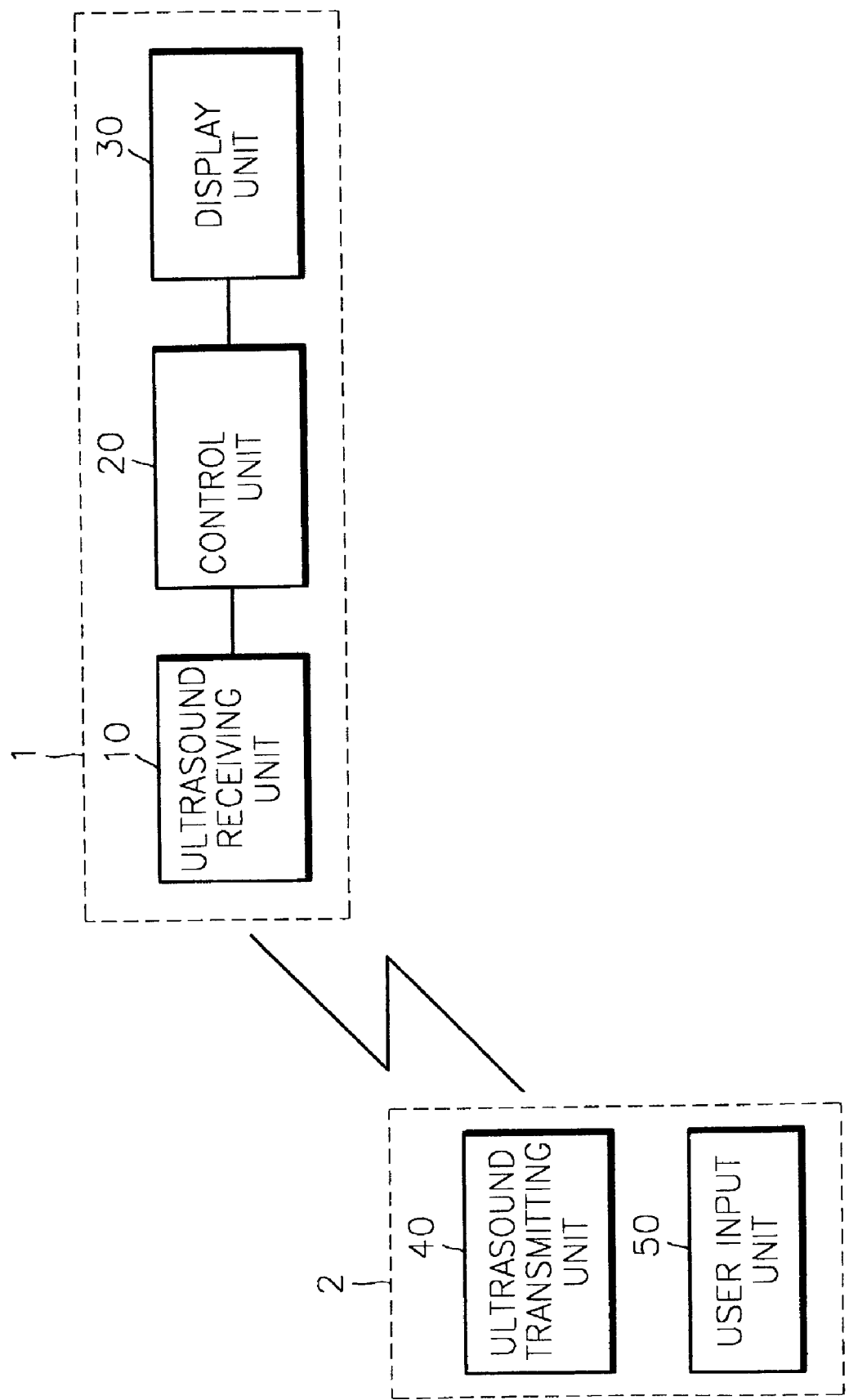
FIG. 1 is a block diagram of an embodiment of a pointing system according to the present invention.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

FIG. 1 is a block diagram of an embodiment of a pointing system according to the present invention. The pointing system of FIG. 1 includes a host apparatus 1 and a pointing apparatus 2 using a conventional 3D pointer control method. The host apparatus 1 is an apparatus such as a digital TV or a computer to display a pointer (not shown) on a display screen of a display unit 30. The host apparatus 1 includes an ultrasound receiving unit 10, a control unit 20, and the display unit 30. The pointing apparatus 2 moves on a virtual plane and outputs an ultrasound signal.

The ultrasound receiving unit 10 receives the ultrasound signal from the pointing apparatus 2 and outputs the ultrasound signal as an electric signal. The control unit 20 receives the electric signal from the ultrasound receiving unit 10, calculates a position on the display screen corresponding to that of the pointing apparatus 2, and outputs the control signal so that the pointer is located/positioned at the calculated position. More specifically, the ultrasound receiving unit 10 receives the ultrasound signal from at least three different points and outputs them as three electric signals. The control unit 20 receives the three electric signals and outputs a control signal corresponding to the electric signals to move the pointer at the position on the display screen of the display unit 30 to correspond to that of the pointing apparatus 2.

The pointing apparatus 2 is an apparatus to control the host apparatus 1, such as a remote controller or a mouse. The pointing apparatus 2 includes a user input unit 50 to which a user command is input and an ultrasound transmitting unit 40 that receives a command to transmit the ultrasound signal, generates an ultrasound signal, and transmits the ultrasound signal to the host apparatus 1.

Figure 2:
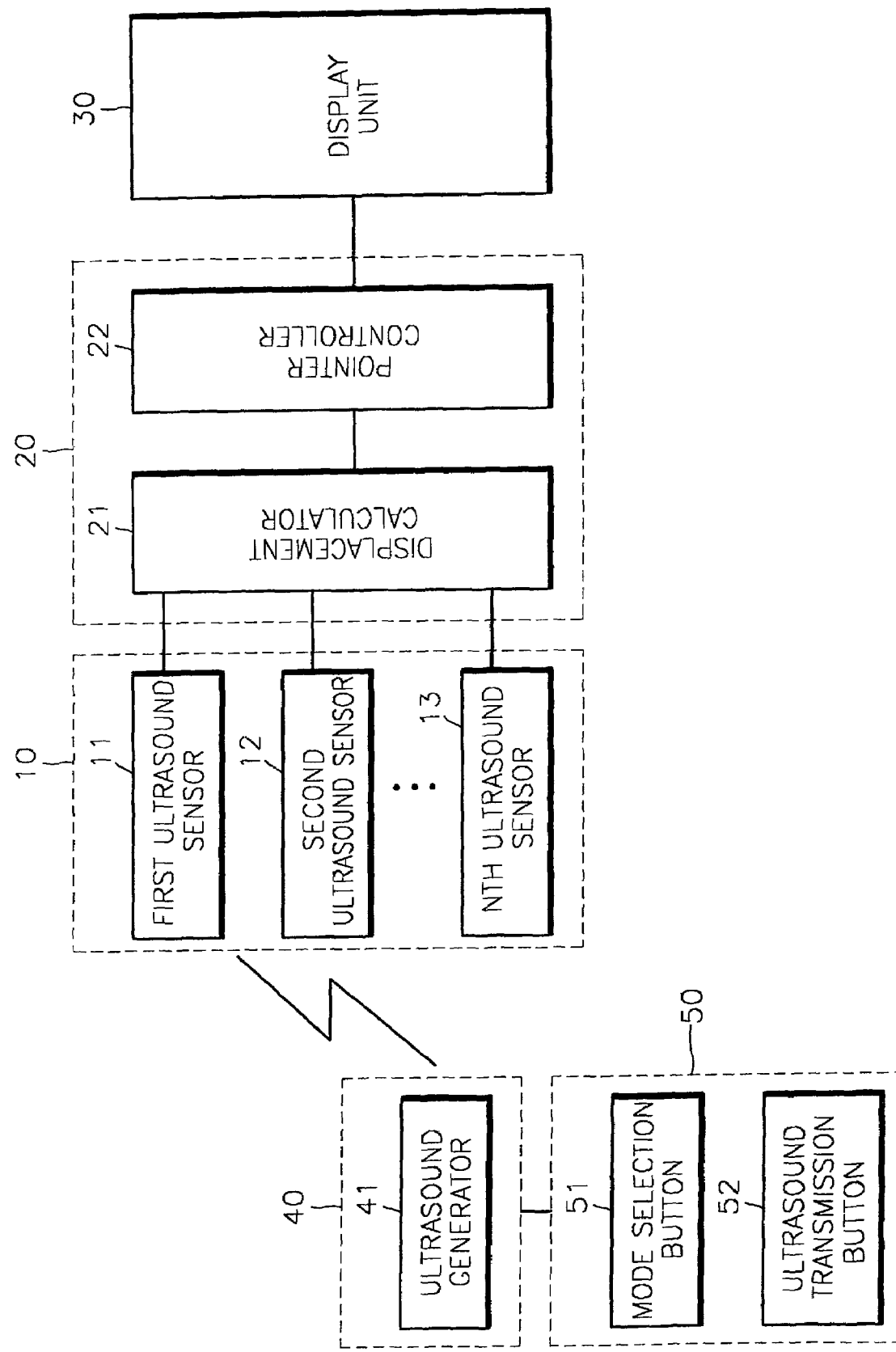
FIG. 2 is a block diagram of a first embodiment of the pointing system shown in FIG. 1.

FIG. 2 is a block diagram of a first embodiment of the pointing system of FIG. 1. Referring to FIG. 2, the ultrasound transmitting unit 40 of the pointing apparatus 2 includes an ultrasound generator 41 to generate the ultrasound signal. The user input unit 50 includes an ultrasound transmission button 52, through which a command to transmit the ultrasound signal is input to the ultrasound generator 41, and a mode selection button 51 to select an absolute mode or a relative mode. In case the absolute mode is selected, the ultrasound generator 41 generates the ultrasound signal only when the command is given to transmit the ultrasound signal via the ultrasound transmission button 52. If the relative mode is selected, the ultrasound generator 41 keeps generating the ultrasound signal at predetermined intervals of time. The absolute mode is an operation mode according to an embodiment of the present invention, and the relative mode is a mode where a pointer is positioned at the display screen according to a difference, i.e., a relative position, between previous and current positions of the pointing apparatus 2 regardless of an absolute position of the pointing apparatus 2. That is, in the relative mode, the position of the pointer on the display screen depends on the relative position of the pointing apparatus 2, and the pointer moves once the pointing apparatus 2 moves.

The ultrasound receiving unit 10 of the host apparatus 1 includes a plurality of ultrasound sensors, i.e., first through nth ultrasound sensors 11, 12, . . . , and 13, which are installed in at least three different points to receive the ultrasound signal and to output electric signals based on the ultrasound signal. In an exemplary embodiment, the ultrasound sensors 11, 12, . . . , and 13 are installed at three vertices of the display screen of the display unit 30. The control unit 20 includes a displacement calculator 21 and a pointer controller 22. The displacement calculator 21 receives the electric signals output from the ultrasound sensors 11, 12, . . . , and 13, determines a position on the display screen at which the pointer is to be located to correspond to that of the pointing apparatus 2, and calculates a displacement between the current position and the determined position of the pointer. The pointer controller 22 outputs the control signal to the display unit 30 to position the pointer according to the calculated displacement.

More specifically, the displacement calculator 21 calculates a difference between the time when one of the ultrasound sensors 11, 12, . . . , or 13 first receives the ultrasound signal and the time when the other ultrasound sensors 11, 12, . . . , or 13 receive the ultrasound signal. Based on the difference, the displacement calculator 21 determines the position on the display screen where the pointer is to be positioned to correspond to that of the pointing apparatus 2, and calculates the displacement between the current position and determined position of the pointer. An algorithm of the displacement calculator 21 will be described later.

Figure 3:
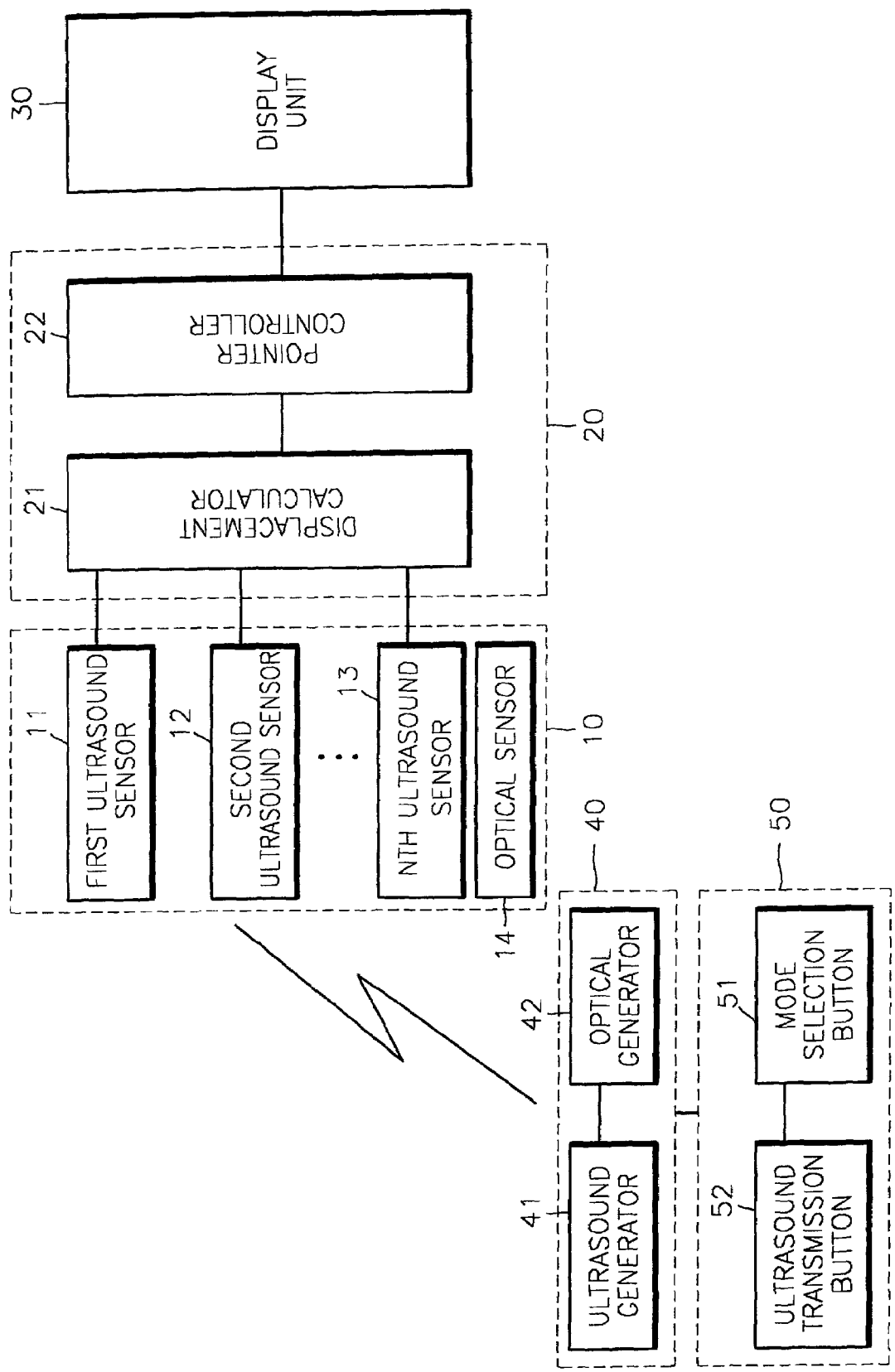
FIG. 3 is a block diagram of a second embodiment of the pointing system shown in FIG. 1.

FIG. 3 is a block diagram of a second embodiment of the pointing system of FIG. 1. For convenience, elements that have the same structure and functions as those in FIG. 2 are described with the same reference numerals, and corresponding descriptions are omitted.

Referring to FIG. 3, an ultrasound transmitting unit 40 of the pointing apparatus 2 further includes an optical generator 42 and the ultrasound generator 41. In this embodiment, the first through nth ultrasound sensors 11, 12, . . . , and 13 are installed on least three vertices of a rectangular display screen (not shown). As shown in FIG. 2, the user input unit 50 includes the ultrasound transmission button 52, and the mode selection button 51 to select the absolute mode or the relative mode. The absolute mode and the relative mode are as described in the first embodiment.

The ultrasound receiving unit 10 of the host apparatus 1 further includes an optical sensor 14 to detect a light signal from the optical generator 42, in addition to the first through nth ultrasound sensors 11, 12, . . . , and 13. The control unit 20 includes the displacement calculator 21 and the pointer controller 22. The displacement calculator 21 receives the electric signals output from the ultrasound sensor 11, 12, . . . , and 13, detects the position on the display screen where the pointer is to be located or positioned using the received electric signals, and calculates the displacement in the current and the detected positions of the pointer. The pointer control unit 22 outputs the control signal to the display unit 30 to move the pointer according to the displacement calculated by the displacement calculator 21.

More specifically, in this embodiment, the displacement calculator 21 measures the time when the optical sensor 14 detects the light signal and the times when the ultrasound sensors 11, 12, . . . , and 13 receive the ultrasound signal, respectively. Then, the displacement calculator 21 calculates the distance between the pointing apparatus 2 and each of the ultrasound sensors 11, 12, . . . , and 13 according to the measured times and calculates the position of the pointing apparatus 2 with the calculated distances. Lastly, the displacement calculator 21 calculates the displacement of the pointer. An algorithm of the displacement calculator 21 will be described later.

Figure 4:
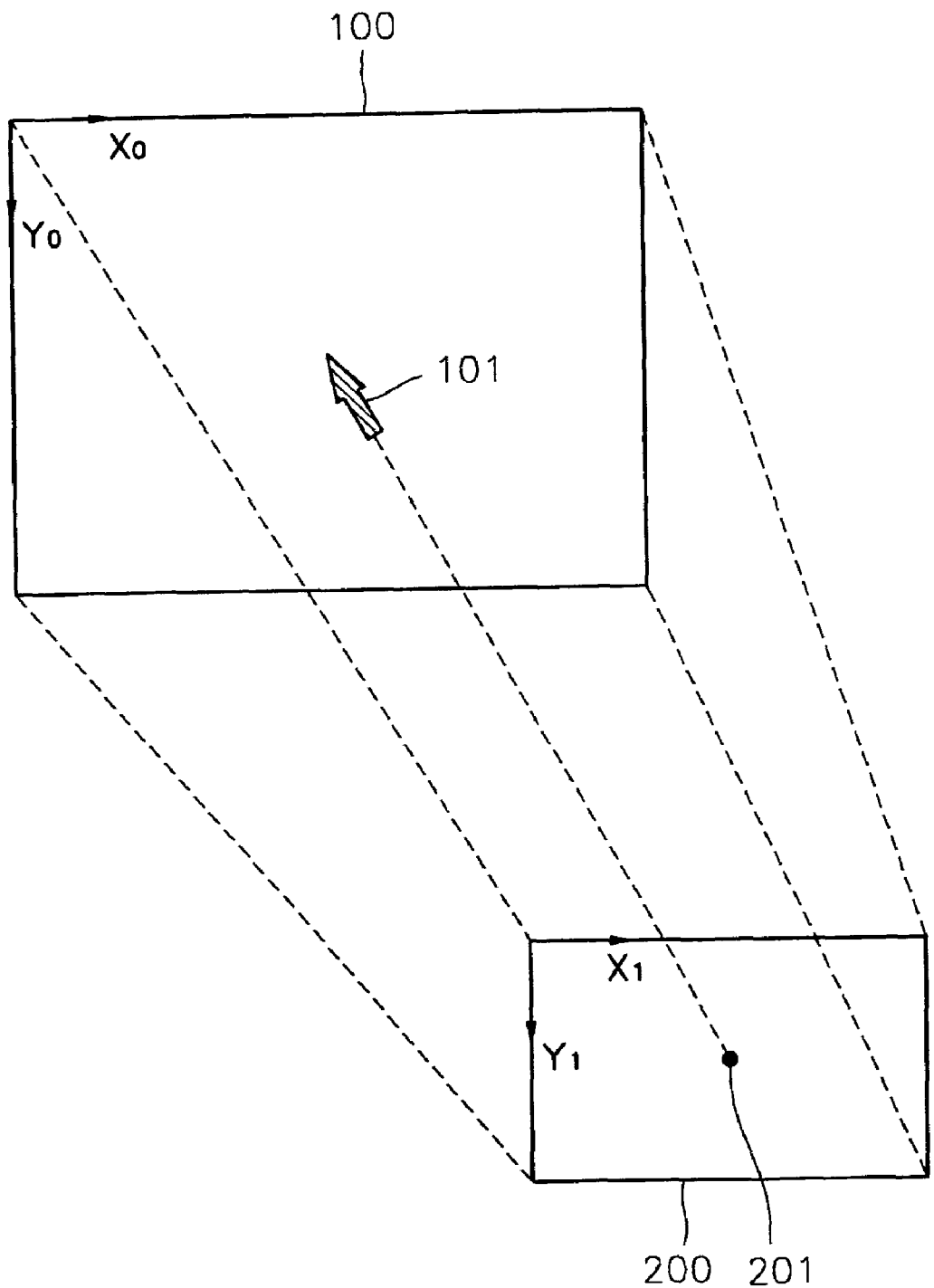
FIG. 4 is a diagram illustrating an algorithm of a displacement calculator shown in FIG. 2 or FIG. 3.

FIG. 4 is a diagram illustrating the algorithm of the displacement calculator 21. Referring to FIG. 4, the algorithm of the displacement calculator 21 calculates a position 101 on a display screen 100 of the display unit 30T which the pointer is to be located, that corresponds to a position 201 of the pointing apparatus 2 on a virtual plane 200 on which the pointing apparatus 2 moves. Next, the displacement between the current position of the pointer and the calculated position 101 of the pointer is calculated. For instance, if the current position of the pointer is $(x_1, Y_1)$ and the calculated position 101 is $(x_2, Y_2)$, the displacement of the pointer is calculated from $(x_2-x_1, Y_2-Y_1)$.

Figure 5:
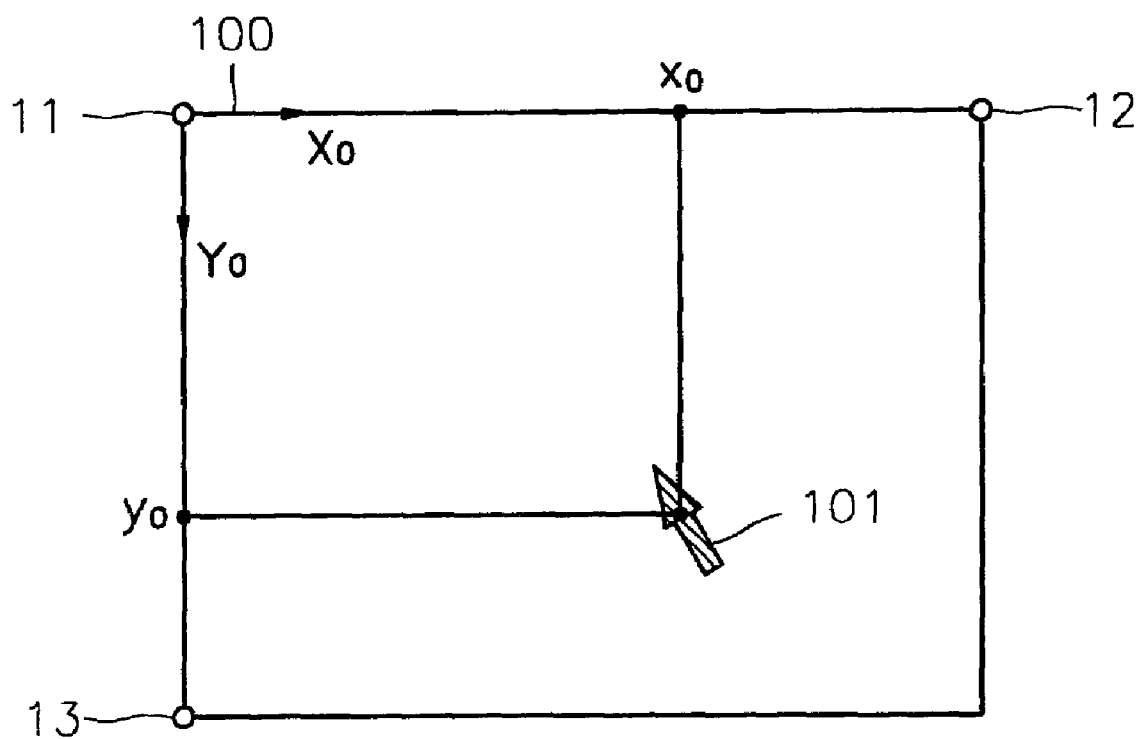
FIG. 5 is a diagram illustrating a first embodiment of the algorithm of the displacement calculator.

FIG. 5 is a diagram explaining a first embodiment of an algorithm of the displacement calculator 21. Referring to FIGS. 4 and 5, when the first through nth ultrasound sensors 11, 12, . . . , and 13, respectively, receive the ultrasound signal from the at least three vertices of the rectangular display screen 100, which is indicated with a vertical axis $X_0$ and a horizontal axis $Y_0$, a difference $\Delta t1$ between times when the first and second ultrasound sensors 11 and 12 receive the ultrasound signal and a difference $\Delta t2$ between times when the first and nth ultrasound sensors 11 and 13 receive the ultrasound signal are calculated. Next, points $x_0$ and $y_0$ are set on the vertical and horizontal axes $X_0$ and $y_0$ of the display screen 100 according to the differences $\Delta t1$ and $\Delta t2$. Thereafter, an intersection of lines which are extended vertically and horizontally from the set points $x_0$ and $Y_0$, respectively, is determined to be the position 101 on the display screen 100 at which the pointer is to be located, that corresponds to the position 201 of the pointing apparatus 2. For instance, if $\Delta t1$ 0, $x_0$ is positioned between the first and second ultrasound sensors 11 and 12. On the other hand, if $\Delta t1$ is a positive value, $x_0$ is positioned adjacent to the second ultrasound sensor 12, and if $\Delta t2$ is a negative value, $x_0$ is positioned adjacent to the first ultrasound sensor 11. Therefore, the position of $x_0$ is determined to be in proportion to $\Delta t1$; that is, the larger $\Delta t1$, the closer $x_0$ approximates each ultrasound sensor 11, 12, or 13.

Figure 6:
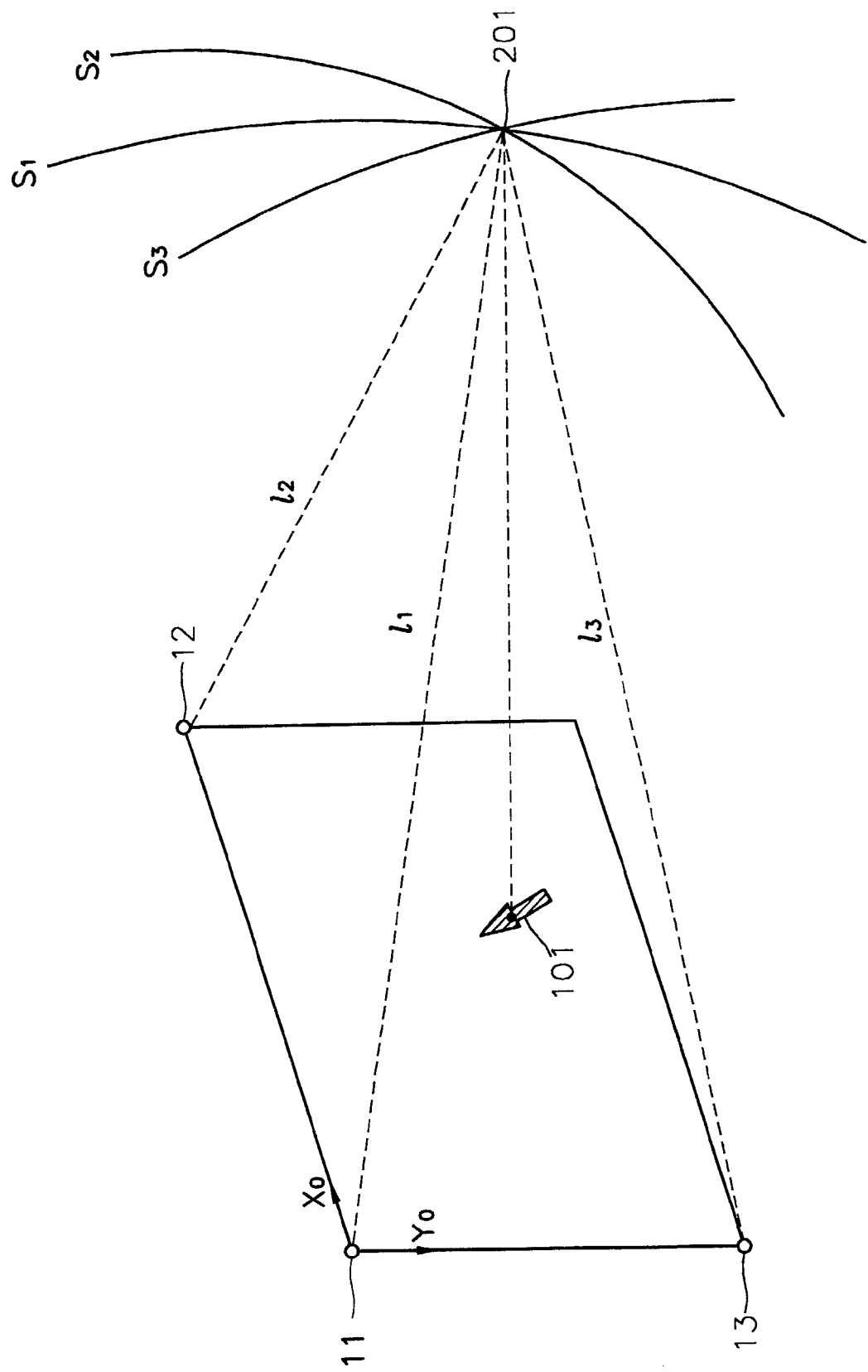
FIG. 6 is a diagram illustrating a second embodiment of the algorithm of the displacement calculator.

FIG. 6 is a diagram illustrating a second embodiment of an algorithm of the displacement calculator 21. Referring to FIGS. 4 and 6, a time measured when the light signal is received and the ultrasound signal is transmitted and is set to be the time t0, and times t1, t2, and t3 are measured when the three ultrasound sensors 11, 12, and 13 that are each installed at three different positions, respectively, receive the ultrasound signal. Then, times $\Delta t1$, $\Delta t2$, and $\Delta t3$ spent transmitting the ultrasound signal from the pointing apparatus 2 to the ultrasound sensors 11, 12, and 13 are calculated by the following equation:

$$\Delta t1 = t0 - t1$$

$$\Delta t2 = t0 - t2$$

$$\Delta t3 = t0 - t3 \qquad (1)$$

The speed of light is 300,000 km/sec, and so, a difference between the time when the optical sensor 14 detects the light signal and the time when the ultrasound signal is transmitted is very small. Therefore, it is regarded that the time when the light signal is received is identical to the time t0 when the ultrasound signal is transmitted.

Next, distances $\ell 1$, $\ell 2$, and $\ell 3$ between the pointing apparatus 2 and the three different positions are calculated, and the position 201 of the pointing apparatus 2 is calculated using the differences $\ell 1$, $\ell 2$, and $\ell 3$ as follows:

$$\ell 1 = \Delta t1 \times 340 \text{ m/sec}$$

$$\ell 2 = \Delta t2 \times 340 \text{ m/sec}$$

$$\ell 3 = \Delta t3 \times 340 \text{ m/sec} \ldots (2)$$

wherein 340 m/sec indicates the speed of the ultrasound signal and is variable because the speed of the ultrasound signal depends on a temperature of the medium through which the ultrasound signal travels. Referring to FIG. 6, the position 201 of the pointing apparatus 2 is an intersection of three spheres S1, S2, and S3 having the three different points at which the ultrasound sensors 11, 12, and 13 are installed as centers and having the distances $\ell 1$, $\ell 2$, and $\ell 3$ as radii, respectively. Once the virtual plane 200 containing the calculated position 201 of the pointing apparatus 2 and being parallel to the display screen 100 is set, the position 101 on the display screen 100 where the pointer is to be located can be easily calculated.

Hereinafter, a pointer control method using the algorithms according to the present invention will be described with the accompanying drawings.

FIG. 7 is a flowchart illustrating an exemplary embodiment of the pointer control method according to the present invention. Referring to FIG. 7, at operation 701, the host apparatus 1 receives the ultrasound signal from the pointing apparatus 2. Next, at operation 702, the host apparatus 1 determines the position on the display screen of the display unit 30 on which the pointer is to be positioned with reference to the time when the host apparatus 1 receives the ultrasound signal. Thereafter, at operation 703, the display unit 30 displays the pointer at the determined position on the display screen.

FIG. 8 is a flowchart explaining in detail operations 701 and 702 shown in FIG. 7. Referring to FIG. 8, at operation 801, the ultrasound signal is received from at least three vertices of the rectangular display screen, which is indicated with horizontal and vertical axes $X_0$ and $Y_0$. Next, at operation 802, the position on the display screen corresponding to that of the pointing apparatus 2, which moves on the rectangular virtual plane and is indicated with vertical and horizontal axes $X_1$ and $Y_1$, is calculated with reference to the time when the ultrasound signal is received.

FIG. 9 is a flowchart illustrating another embodiment of the pointer control method according to the present invention. Referring to FIG. 9, at operation 901, the host apparatus 1 receives the ultrasound signal and the light signal from the pointing apparatus 2. Next, at operation 902, the host apparatus 1 calculates the position on the display screen corresponding to that of the pointing apparatus 2 using the time when the ultrasound signal and the light signal are received. Thereafter, at operation 903, the display unit 30 displays the pointer at the calculated point of the display screen.

FIG. 10 is a flowchart explaining in detail operations 901 and 902 shown in FIG. 9. Referring to FIG. 10, at operation 1001, the ultrasound signal and the light signal are received from at least three vertices of the display screen. Then, at operation 1002, the absolute position of the pointing apparatus 2 is determined with reference to the times when the ultrasound signal and the light signal are received. Next, at operation 1003, the position on the display screen at which the pointer is to be positioned and corresponding to the determined absolute position is calculated.

When the pointer moves to a desired menu on the display screen, the pointing apparatus 2 is given an executing command to execute the menu and to transmit the command to the host apparatus 1. For this operation, the pointing apparatus 2 may further include an executive command transmitter (not shown) such as a light emitting diode (LED) and an infrared generator. Further, the user input unit 50 may include an execution button (not shown) to input the executing command to the executing command transmitter. If the user presses the executing button, the executing command transmitter sends the executing command to the host apparatus 1. Like conventional host apparatuses, the host apparatus 1, according to the present invention, includes the executing command receiver (not shown) to receive the executing command, and the controlling unit 20 processes the executing command and then runs the menu. The pointing system, according to the present invention, detects the position of the pointing apparatus 2 and positions the pointer on the display screen to correspond to the detected position. However, the executing command may be received using various methods, as well as, a method adopted by conventional remote controllers.

As described above, a pointing apparatus according to the present invention includes an ultrasound transmitting unit and a user input unit, and an algorithm to detect a position of the pointing apparatus is performed by a host apparatus, thereby simplifying a structure of the pointing apparatus and reducing power consumption. Also, the ultrasound transmitting unit is less affected by outer ambient conditions than conventional inertial sensors, such as a gyrosensor and an acceleration sensor. In other words, the pointing apparatus, according to the present invention, is lighter and more convenient to use, and has a longer battery charge period, thereby increasing use convenience to a user.

Also, an algorithm according to the present invention enables an absolute position of the pointing apparatus to be calculated. Thus, while using the pointing apparatus, the user can expect a movement of a pointer to a certain degree of precision. This expectation reduces a learning curve on how to use the pointing apparatus.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A pointing apparatus, comprising:
   a user input unit to generate a user command; and
   an ultrasound transmitting unit to receive the user command to transmit an ultrasound signal, to generate the ultrasound signal, and to transmit the ultrasound signal continuously or exclusively when the command is given to transmit the ultrasound signal to a host apparatus;
   wherein the user input unit comprises a mode selection button to set an absolute mode and an ultrasound transmission button; and
   wherein the ultrasound transmitting unit generates and sends the ultrasound signal to the host apparatus, when the user command to transmit the ultrasound signal, via the ultrasound transmission button, is received and the absolute mode is selected.

2. The pointing apparatus of claim 1, wherein the mode selection button is also to set a relative mode where the ultrasound transmitting unit continuously generates the ultrasound signal at predetermined intervals of time and transmits the ultrasound signal to the host apparatus.

3. A host apparatus, comprising:
   a display screen;
   an ultrasound receiving unit to receive an ultrasound signal from a pointing apparatus, and to output an electric signal; and
   a controlling unit to calculate a position of a pointer on the display screen corresponding to a position of the pointing apparatus based on the electric signal output from the ultrasound receiving unit, and to output a control signal to the display screen to position the pointer at the calculated position on the display screen;
   wherein the ultrasound receiving unit receives the ultrasound signal at least three vertices of the display screen; and
   wherein the controlling unit calculates the position of the pointer on the display screen based on time differences between a time when the ultrasound receiving unit receives the ultrasound signal at one of the at least three vertices at which the ultrasound receiving unit first receives the ultrasound signal, and times when the ultrasound receiving unit receives the ultrasound signal at remaining ones of the at least three vertices.

4. The host apparatus of claim 3, further comprising a display unit to display the pointer on the display screen.

5. The host apparatus of claim 4, wherein the ultrasound receiving unit generates the electric signal from the ultrasound signal, and outputs the electric signal to the controlling unit; and
   wherein the controlling unit generates the control signal from the electric signal, and outputs the control signal to the display unit to move the pointer to the position on the display screen corresponding to the position of the pointing apparatus, which moves on a virtual plane.

6. The host apparatus of claim 4, wherein the ultrasound receiving unit comprises ultrasound sensors at the at least three vertices of the display screen to receive the ultrasound signal from the pointing apparatus, and to output electrical signals based on the ultrasound signal; and
   wherein the controlling unit comprises:
   a displacement calculator to measure the time differences based on the electrical signals output from the ultrasound sensors, to determine the position of the pointer based on the time differences, and to calculate a displacement between a current position and the determined position of the pointer; and
   a pointer controller to output a control signal to the display unit to position the pointer on the display screen according to the displacement calculated by the displacement calculator.

7. The host apparatus of claim 6, wherein the displacement calculator measures the time differences by calculating time differences between a time when one of the ultrasound sensors that first receives the ultrasound signal receives the ultrasound signal, and times when remaining ones of the ultrasound sensors receive the ultrasound signal.

8. The host apparatus of claim 7, wherein the displacement calculator determines the position of the pointer by setting a point on a first axis and a point on a second axis based on the time differences, and determining an intersection of a line extending from the point set on the second axis in a direction of the first axis and a line extending from the point set on the first axis in a direction of the second axis as the position of the pointer.

9. The host apparatus of claim 3, wherein the pointing apparatus comprises:
   a user input unit to generate a user command; and
   an ultrasound transmitting unit comprising:
   an optical generator to generate a light signal, and to send the light signal to the host apparatus, and
   an ultrasound generator to generate an ultrasound signal and to send the ultrasound signal to the host apparatus when receiving the command to transmit the ultrasound signal via the user input unit.

10. The host apparatus of claim 9, wherein the user input unit comprises a mode selection button, and, when a relative mode is set, the ultrasound generator and the optical generator generate and output the ultrasound signal and the light signal at predetermined intervals of time substantially at a same time to the host apparatus.

11. The host apparatus of claim 9, wherein the user input unit comprises a mode selection button and an ultrasound transmission button, and when an absolute mode is set using the mode selection button, and the ultrasound transmission button outputs the command to transmit the ultrasound signal, the ultrasound generator and the optical generator generate and output the ultrasound signal and the light signal substantially at a same time to the host apparatus.

12. A host apparatus, comprising:
a rectangular display screen;
an ultrasound receiving unit to receive an ultrasound signal and a light signal from a pointing apparatus, and to output electric signals; and
a controlling unit to calculate a position of a pointer on the rectangular display screen corresponding to a position of the pointing apparatus based on an intersection of at least three spheres, the intersection of the least three spheres being determined using the electric signals from the ultrasound receiving unit, and to output a control signal to the rectangular display screen to move the pointer to the calculated position; wherein the ultrasound receiving unit comprises ultrasound sensors at least three vertices of the rectangular display screen.

13. The host apparatus of claim 12, further comprising a display unit to display the pointer on the rectangular display screen.

14. The host apparatus of claim 13, wherein the ultrasound sensors receive the ultrasound signal from the pointing apparatus, and output electric signals based on the ultrasound signal;
wherein the ultrasound receiving apparatus further comprises an optical sensor to receive the light signal from the pointing apparatus, and to output an electric signal based on the light signal; and
wherein the controlling unit comprises:
a displacement calculator to determine the intersection of the least three spheres using the electric signals from the ultrasound sensors and the optical sensor, to determine an absolute position of the pointing apparatus based on the intersection of the at least three spheres, to determine the position of the pointer based on the absolute position of the pointing apparatus, and to calculate a displacement between a current position of the pointer and the determined position of the pointer; and
a pointer controller to output a control signal to the display unit to position the pointer on the rectangular display screen according to the displacement calculated by the displacement calculator.

15. The host apparatus of claim 14, wherein the displacement calculator measures times when the light signal and the ultrasound signal are received, calculates distances between the pointing apparatus and the at least three vertices based on the measured times, calculates the intersection of the at least three spheres based on the calculated distances, determines the absolute position of the pointing apparatus as the intersection of the at least three spheres, and calculates the position of the pointer on the rectangular display screen based on the absolute position of the pointing apparatus.

16. A pointer control method, comprising:
receiving an ultrasound signal from a pointing apparatus;
determining a point on a display screen at which a pointer is to be positioned based on a time when the ultrasound signal is received; and
displaying the pointer at the determined point on the display screen;
wherein the receiving of an ultrasound signal from a pointing apparatus comprises receiving the ultrasound signal from at least three vertices of the display screen; and
wherein the determining of a point on a display screen comprises determining the point on the display screen based on time differences between a time when the ultrasound signal is received at one of the at least three vertices at which the ultrasound signal is first received, and times when the ultrasound signal is received at remaining ones of the at least three vertices.

17. The method of claim 16, wherein the determining of the point on the display screen based on time differences comprises:
determining a position of the pointing apparatus, which moves on a virtual plane parallel to the display screen, based on the time differences; and
calculating a position of the point on the display screen to correspond to the determined position of the pointing apparatus.

18. The method of claim 17, wherein the calculating of a position of the point on the display screen comprises:
setting a point on a first axis of the display screen and a point on a second axis of the display screen based on the time differences; and
determining an intersection of a line extending from the point set on the second axis in a direction of the first axis and a line extending from the point set on the first axis in a direction of the second axis as the position of the point on the display screen.

19. A pointer control method, comprising:
receiving an ultrasound signal and a light signal from a pointing apparatus;
determining a point on a display screen at which a pointer is to be positioned based on an intersection of at least three spheres, the intersection of the at least three spheres being determined based on times when the ultrasound signal and the light signal are received; and
displaying the pointer at the determined point on the display screen;
wherein the receiving of an ultrasound signal and a light signal from a pointing apparatus comprises receiving the ultrasound signal from the pointing apparatus at least three vertices of the display screen.

20. The method of claim 19, wherein the determining of a point on the display screen comprises:
determining an absolute position of the pointing apparatus as the intersection of the at least three spheres; and
calculating a position of the point on the display screen to correspond to the absolute position of the pointing apparatus.

21. The method of claim 20, wherein the determining of an absolute position of the pointing apparatus comprises:
calculating distances between the pointing apparatus and the at least three vertices of the display screen based on the times when the ultrasound signal and the light signal are received; and
determining the intersection of the at least three spheres as an intersection of at least three spheres having the at least three vertices of the display screen as centers and the calculated distances as radii.

* * * * *

UNITED STATES PATENT AND TRADEMARK OFFICE
CERTIFICATE OF CORRECTION

PATENT NO. : 7,301,530 B2  Page 1 of 1
APPLICATION NO. : 10/238879
DATED : November 27, 2007
INVENTOR(S) : Sung-jin Lee et al.

It is certified that error appears in the above-identified patent and that said Letters Patent is hereby corrected as shown below:

Column 10, line 6, insert --at-- after "signal".

Column 10, line 63, insert --,-- after "signal".

Column 11, line 27, start new paragraph after before "wherein".

Column 11, line 29, insert --at-- before "at".

Column 12, line 5, change "from" to --at--.

Signed and Sealed this

Thirteenth Day of May, 2008

JON W. DUDAS
*Director of the United States Patent and Trademark Office*